(12) United States Patent
Garg et al.

(10) Patent No.: US 6,631,633 B1
(45) Date of Patent: Oct. 14, 2003

(54) METHOD AND APPARATUS FOR CALIBRATING A VARIABLE FORCE SOLENOID

(75) Inventors: Vijay K. Garg, Canton, MI (US); Zheng Lou, Plymouth, MI (US); Alfred E. Lynn, Troy, MI (US); David Jorgensen, Chelsea, MI (US); Gang Xu, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 116 days.

(21) Appl. No.: 09/704,885

(22) Filed: Nov. 2, 2000

(51) Int. Cl.[7] .................................................. G01L 27/00
(52) U.S. Cl. ...................... 73/1.57; 137/1; 251/129.16
(58) Field of Search ............................. 73/1.57; 137/1; 251/129.16

(56) References Cited

U.S. PATENT DOCUMENTS

| 4,947,893 A | | 8/1990 | Miller et al. |
| 5,110,087 A | * | 5/1992 | Studtmann et al. .... 251/129.16 |
| 5,197,507 A | | 3/1993 | Miki et al. |
| 5,986,530 A | * | 11/1999 | Nippert et al. ......... 251/129.16 |
| 6,224,033 B1 | * | 5/2001 | Kumar ........................ 29/606 |

* cited by examiner

Primary Examiner—Hezron Williams
Assistant Examiner—André K. Jackson
(74) Attorney, Agent, or Firm—Quarles & Brady LLP (57) ABSTRACT

A variable force solenoid valve assembly generally includes a coil, magnetic pole, armature, and one or more variable size air gaps that are disposed within the solenoid. The solenoid may be calibrated by first energizing the solenoid coils and determining a corresponding desired hydraulic pressure, measuring the actual hydraulic pressure, and adjusting the magnetic flux until the desired output pressure is achieved.

11 Claims, 9 Drawing Sheets

METHOD AND APPARATUS FOR CALIBRATING A VARIABLE FORCE SOLENOID

BACKGROUND OF THE INVENTION

1. Field of the Invention

The invention relates to a solenoid valve assembly, and more particularly, relates to a method and apparatus for calibrating an assembled variable force solenoid.

2. Description of the Related Art

A typical solenoid comprises a coil of wire that produces a magnetic field when electrical current flows through it. When the magnetic flux passes through a stationary pole piece and a movable armature, the armature is drawn toward pole piece to actuate and control an attached mechanical device through a push rod. A spring element within the solenoid resists the force generated by the magnetic field, and biases the push rod towards its original position. An air gap will typically exist between the pole piece and armature, thereby reducing the magnetic flux during operation of the solenoid.

In a solenoid valve assembly, a solenoid transforms electrical inputs into hydraulic outputs such as the hydraulic pressure or flow that controls various hydraulic devices of a vehicle. For example, in an automatic transmission controller, an input current regulates the hydraulic output pressure, which may be either directly or inversely proportional to the amount of current flowing through the coils of the solenoid. In an inversely proportional solenoid valve assembly, for example, maximum current induces minimum pressure, and minimum current induces maximum pressure. A variable force solenoid (VFS) is a solenoid valve assembly having an integral feedback mechanism.

Achieving accurate control over a VFS requires the balancing of three forces that act on the solenoid: 1) the electromagnetic force produced by the electrical current flowing through the coil; 2) the spring force resisting the electromagnetic force; and 3) the hydraulic feedback force. Improper balancing of these forces may result in undesirable changes in hydraulic output or performance of the solenoid valve. Balancing these three forces requires a properly designed variable force solenoid.

Unfortunately, even if a VFS is properly designed, difficulties remain in providing proper calibration to maintain proper operation of the solenoid. For example, in U.S. Pat. No. 5,197,507, one conventional method of calibrating a solenoid includes the insertion of a predetermined number of metallic spacers between the solenoid housing and valve body, thereby matching electromagnetic force with hydraulic operating point. However, once the assembly of the solenoid valve has been completed, adjusting the number of spacers within the air gap is difficult.

Another calibration process, disclosed in U.S. Pat. No. 4,947,893, involves adding, around a spring adjustment screw, an air gap adjustment plug. The spring adjustment screw is used to calibrate the spring pre-load and, thus, the output pressure at zero current. The air gap adjustment plug is to adjust the minimum air gap and, thus, the electromagnetic force and the resulting output pressure variation. Because of their physical nesting, the movement of the air gap adjustment screw will cause a corresponding movement in the spring adjustment screw, which necessitates adjustment iterations. Furthermore, these two screws nested together are relatively expensive and inefficient to manufacture.

What is therefore needed is a simplified method and apparatus for calibrating a variable force solenoid after assembly of the solenoid valve has been completed.

BRIEF SUMMARY OF THE INVENTION

In accordance with a first aspect of the invention, a variable force solenoid is provided having a flux path including a variable size air gap disposed therein so as to permit the adjustment of the amount of magnetic flux that acts on the armature after assembly of the solenoid. A primary air gap is disposed between the magnetic pole piece and the armature. A secondary air gap is formed between the out wall of the armature and the inner wall of the solenoid housing. The solenoid may be calibrated by first energizing the solenoid coils and determining a corresponding desired hydraulic pressure, measuring the actual hydraulic pressure, and adjusting the magnetic flux until the desired output pressure is achieved.

These as well as other features and characteristics of the present invention will be apparent from the description which follows. In the detailed description below, preferred embodiments of the invention will be described with reference to the accompanying drawings. These embodiments do not represent the full scope of the invention. Rather the invention may be employed in other embodiments, and reference should therefore be made to the claims herein for interpreting the breadth of the invention.

BRIEF DESCRIPTION OF THE DRAWINGS

Reference is hereby made to the following figures in which like reference numerals correspond to the like parts throughout and in which.

DETAILED DESCRIPTION OF THE INVENTION

Figure 1A:
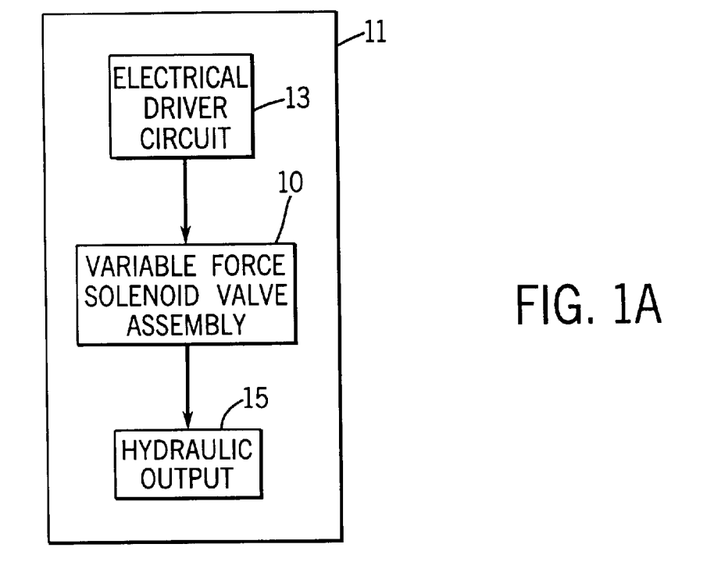
FIG. 1A is a block diagram of an automatic transmission controller including a variable force solenoid valve assembly in accordance with the preferred embodiment of the present invention.
Figure 1B:
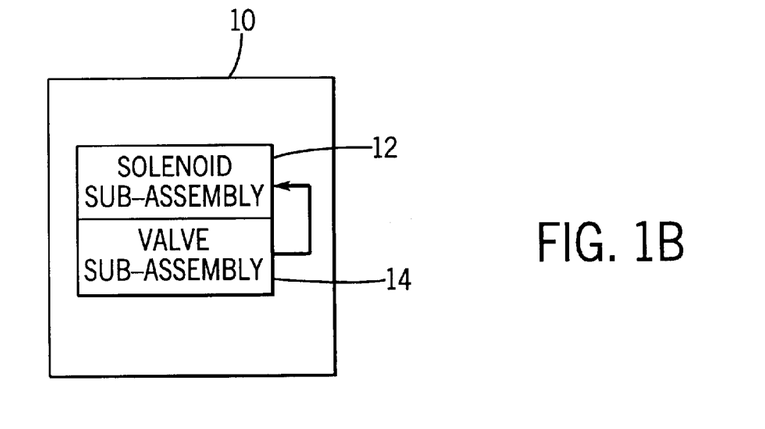
FIG. 1B is a block diagram of the variable force solenoid valve assembly of FIG. 1A.

Referring initially to FIGS. 1A and 1B, a schematic representation of the preferred embodiment is illustrated wherein a variable force solenoid (VFS) valve assembly 10 is installed within an automatic transmission controller 11 as an interface between an electrical driver circuit 13 and a hydraulic output 15. The solenoid valve assembly 10 includes a solenoid subassembly 12 that interacts with a valve subassembly 14 which are also referred to as the solenoid and valve, respectively, hereinafter for the purposes of clarity and convenience. In operation, the solenoid 12 receives electrical input signals from the electrical driver circuit 13 and imparts an electromagnetic force onto the valve 14, which causes the valve to regulate fluid output within the various flow channels of the automatic transmission controller 11, as is well known in the art. Once such valve is disclosed in a copending patent application entitled "Solenoid Operated Hydraulic Control Valve" filed on Apr. 23, 1999, the disclosure of which is hereby incorporated by reference.

Figure 2A:
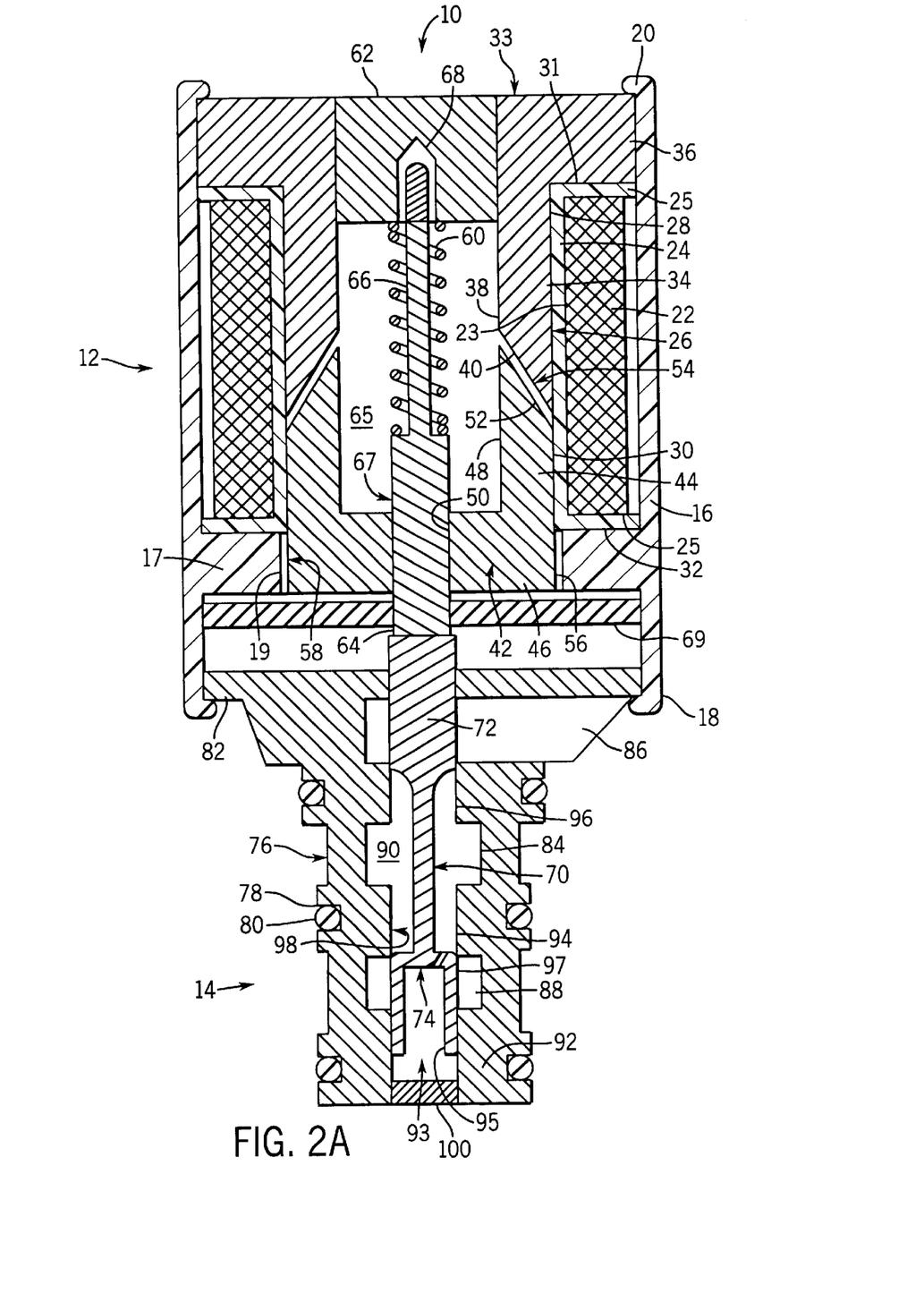
FIG. 2A is a sectional side elevation view of a solenoid in accordance with the preferred embodiment shown in a neutral position.

Referring now to FIG. 2A, the VFS valve assembly 10 includes the solenoid 12 connected to the valve 14. The solenoid 12 is encased by an annular housing 16 having a lower end 18 and an upper end 20 which extend radially inwardly so as to secure the solenoid 12 to the valve 14.

An annular wire coil assembly 22 is disposed radially inwardly of, and adjacent, the housing 16. The wire coil 22 defines a bore 23 and upper and lower surfaces 25 that are surrounded by an armature sleeve 24. The armature sleeve 24 further defines a bore 26 including an upper bore portion 28 and a lower bore portion 30 and includes an upper wall 31 and lower wall 32. An annular magnetic pole piece 33 includes an axial portion 34 that is disposed adjacent, and a radially inwardly of, upper bore portion 28, and also includes upper radially outwardly extending portion of pole piece 36 that is disposed above the upper wall 31 of armature sleeve 24 and is encased by the upper end 20 of the housing 16. The pole piece 33 further defines a bore 38 and an lower wall 40 that extends from the bore 38 to the bore 26 of the armature sleeve 24.

An armature 42 that includes an upwardly extending annular portion 44 that is disposed beneath, and generally aligned with, the axial portion 34 of pole piece 33. Upper portion 44 defines a bore 48 that is generally aligned with bore 38 of the pole piece 33, and an angular upper wall 52 extending from the bore 48 to the lower bore 30 portion of armature sleeve 24, and is generally parallel with angular wall 40 of the pole piece 33 and axially offset therefrom so as to form a primary air gap 54 therebetween. The armature 42 further includes a lower radially inwardly extending portion 46 having a bore 50 and outer wall 56. The outer housing 16 includes a radially inwardly extending portion 17 that is disposed below and adjacent lower wall 32 of armature sleeve 24 and is generally aligned with radial portion 46 of the armature 42 and has an inner surface 19 radially offset from outer wall 56, thereby forming a secondary air gap 58 therebetween.

Bores 38 and 48 define a centrally disposed annular cavity 65 that houses a spring 60 that is connected at its upper end to a sleeve 62, and biases armature 42 (and corresponding axially extending plunger 64) either up or down to resist the electromagnetic force output by the solenoid 12 during operation. Bore 50 of armature 42 is configured to be press-fitted with the bottom segment 64 of a push rod 67. Top segment 66 of the push rod 67 is configured to be received by a counter sink 68 formed within the sleeve 62. The push rod 67 is positioned so as to be centrally disposed in the annular cavity. Top segment 66 is somewhat smaller than the bottom segment 64 in diameter to facilitate a preferred assembly process, which is to press push rod 67 into bore 50 with the force being applied at the bottom end of push rod 67. A diaphragm 69 extends radially inwardly from the outer housing 16 to bottom segment 64 of push rod 67 and prevents oil-born contaminants in the valve 14 from entering the solenoid 12.

The valve subassembly 14 includes a spool 70, that is generally aligned with, and connected to, the push rod 67 and includes a first land 72 and a second land 74 extending radially outwardly therefrom. A valve body 76 further defines a plurality of grooves 78 and corresponding seals 80.

The valve body 76 further includes an upper lip 82, which is inserted into a bore at the lower end of the housing 18 and over which the bottom end of the housing 18 is crimped radially inward to join the valve 14 and the solenoid 12. The valve body 76 further defines a control port 84, exhaust port 86, and supply ports 88, respectively. Supply port 88 is connected to a fluid supply so as to provide a fluid intake. The valve body 76 further defines a bore 90 that permits fluid communication between the control port 84 and either the exhaust port 86 or supply port 88 depending on the position of the spool 70, as will be described in more detail below.

To facilitate the fluid communication and reduce undesired flow resistance, there is a substantial undercut around the bore 90 at each of the three ports. The circular intersections between the bore 90 and the two undercuts at the supply port 88 and the exhaust port 86 are two metering edges 94 and 96, respectively. The bore 90 has a diameter slightly larger than the diameter of the first and second lands 72 and 74. The flow from the supply port 88 to the control port 84 is controlled by the axial alignment between the land 74 and the metering edge 94 while that from the control port 84 to the exhaust port 86 is controlled by the axial alignment between the land 72 and the metering edge 96. Because of the diametric clearance between the bore 90 and the lands 72 and 74, there is no complete flow cut-off when a land is axially aligned with its corresponding metering edge. The flow resistance at a metering edge increases with the axial overlap between the metering edge and the land or decreases with the axial underlap. The hydraulic pressure at the control port 84 falls between the pressure values at the supply port 88 and the exhaust port 86 and is thus controlled by relative flow resistance values at the metering edges 94 and 96. A plug 100 seals off the bore 90 at the lower end, limits the downward movement of the spool 70, and forms a control chamber 93 that is enclosed by plug 100, the bottom end of spool 70, and bore 90. Control chamber 93 is connected with control port 84 through a feedback orifice 97.

In operation, when the VFS valve assembly 10 is in the neutral position shown in FIG. 2A, the spool 70 is positioned with the lands 72 and 74 aligned with the metering edges 96 and 94, respectively, so that the pressure at the control port 84 is substantially in-between the supply and exhaust pressures. Because of the feedback orifice 97, the pressure in the control chamber 93 is equal to the pressure in the control port 84, and the resulting feedback pressure force tends to move the spool 70 upwards. This feedback force is balanced by the electromagnetic and spring forces from the solenoid 12, recognizing that the spring force is designed to push the spool 70 downwards, and that the electromagnetic force is designed to help the feedback pressure force counter the spring force. Within the spool displacement range, the spring force is designed not to change substantially. The sum of the feedback pressure force and the electromagnetic force should equal the spring force if other secondary forces such as hydrodynamic flow forces are ignored. Thus the balanced position of the spool 70 is primarily achieved by a proper match between the electromagnetic force and the feedback pressure force due to the control pressure. As a result, the feedback pressure force is inversely proportional to the electromagnetic force, and the control pressure from the valve 14 is inversely proportional to the electric current into the solenoid 12. At the state shown in FIG. 2A, the electromagnetic force is substantially in-between its maximum and minimum values. Upon increased energization of the solenoid subassembly 12, the electromagnetic force induced by the magnetic flux will bias the push rod 67 upwardly towards the central portion of the solenoid, thereby allowing the spool 72 to move to a raised position, as shown in FIG. 2C.

Figure 2B:
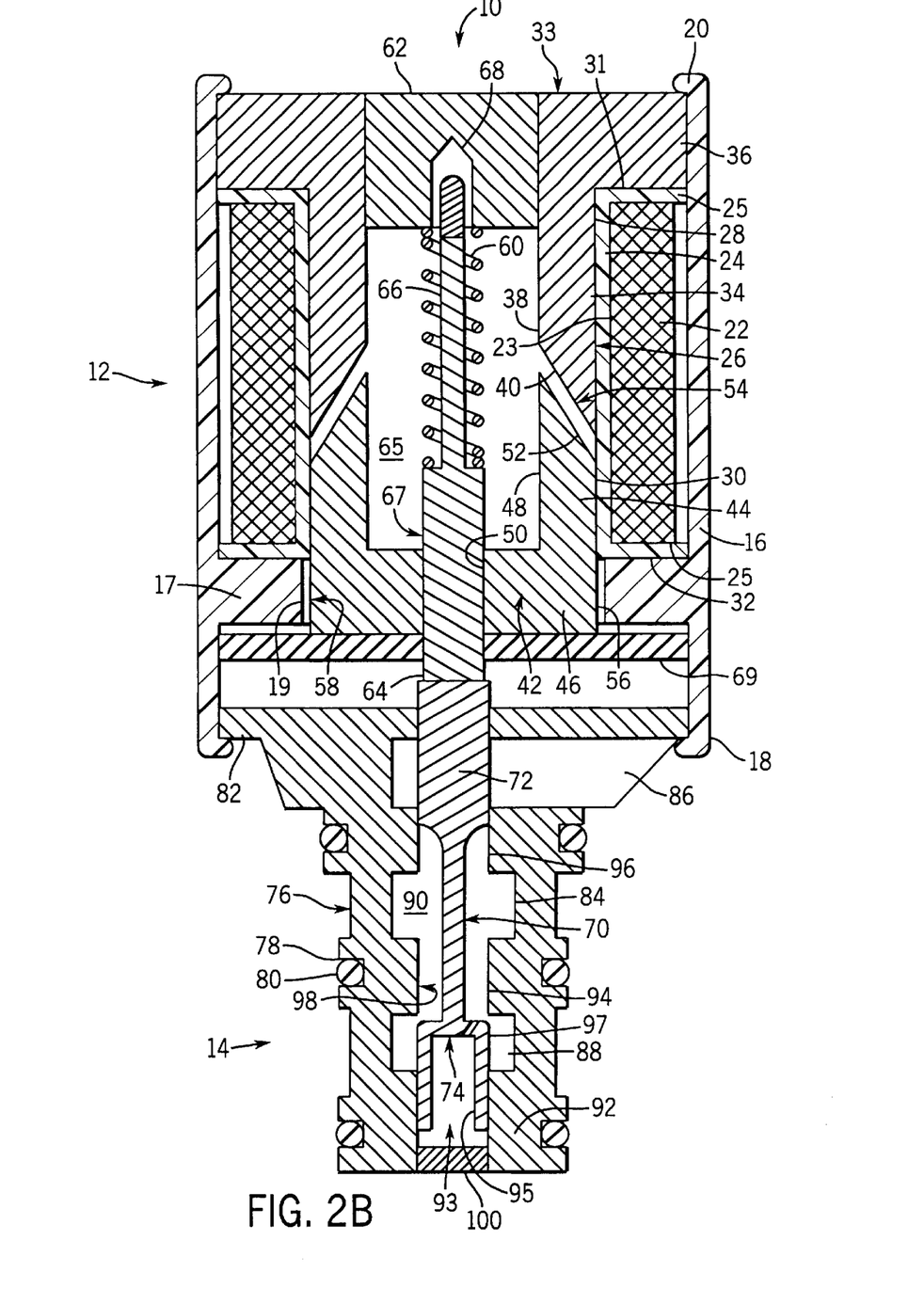
FIG. 2B is a sectional side elevation view of the solenoid of FIG. 2A shown in an extended position.
Figure 2C:
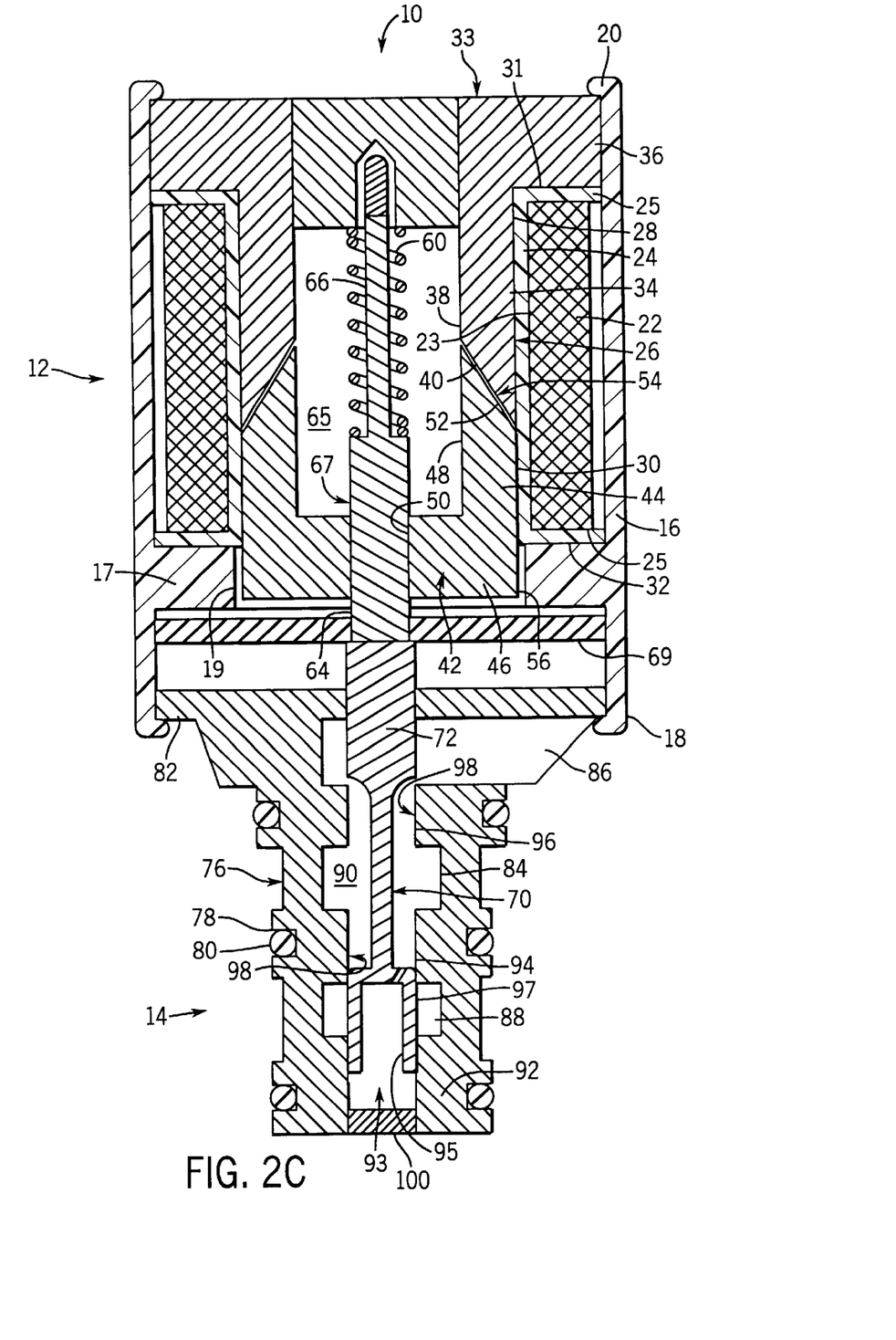
FIG. 2C is a sectional side elevation view of the solenoid of FIG. 2B shown in a contracted position.

Referring now in particular to FIG. 2C, there are a substantial overlap between the land 74 and the metering edge 94 and a substantial underlap between the land 72 and the metering edge 96, resulting a substantial higher flow resistance at the meter edge 94 than that at the metering edge 96. The pressure at the control port 84 is thus substantially closer to the pressure at the exhaust port than that the supply port 88. Alternatively, when the energization of the solenoid subassembly 12 is decreased, the force of the spring 60 will bias the plunger, and correspondingly the spool 70 through the neural position shown in FIG. 2A and towards a lowered position, as shown in FIG. 2B. There are a substantial underlap between the land 74 and the metering edge 94 and a substantial overlap between the land 72 and the metering edge 96, resulting a substantial lower flow resistance at the meter edge 94 than that at the metering edge 96. The pressure at the control port 84 is thus substantially closer to the pressure at the supply port than that the exhaust port 88. It should be appreciated that the spool may move only a fraction of a millimeter during operation and, accordingly, the drawings are not necessarily drawn to scale with respect to the relative motion between the spool and the valve subassembly.

It should be appreciated that forces in a VFS valve assembly 10 vary from one assembly to another. Proper balancing of these forces will ensure accurate operation of the VFS valve assembly 10. Each assembly needs to be calibrated to have consistent output, which the control pressure at the control port 84. For the VFS valve assembly shown in FIG. 1, the control pressure is inversely proportional to the electric current through the coils 22. The calibration is typically performed with two steps. The first step is to adjust the axial position of the sleeve 62 and thus the pre-load of the spring 60 at the zero or substantially low electric current such that the control pressure is within the tolerance at its high value range. The next step is to adjust the electromagnetic force at the peak or substantially high electric current such that the control pressure is within the tolerance at its low value range. If non-zero electric current value is used in the first step, it may be needed to repeat step 1 and even step 2 after step 2 is complete in the first iteration for improved accuracy.

Figure 3:
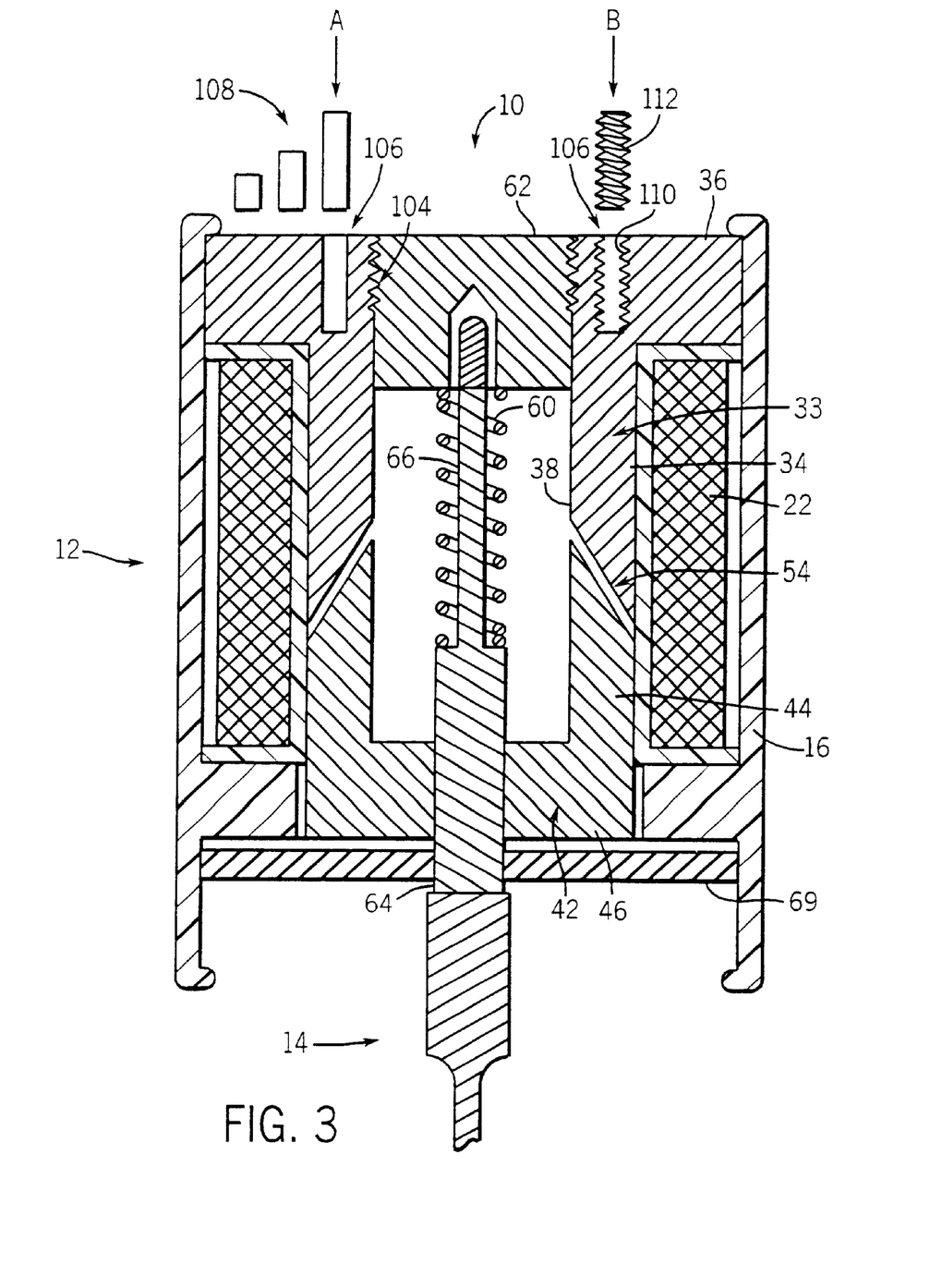
FIG. 3 is a sectional side elevation view of the solenoid in accordance with the preferred embodiment illustrating calibration mechanisms.

Referring now to FIG. 3, an alternative embodiment of the VFS valve assembly 10 includes a set of threads 104 that allows for easy adjustment of the sleeve 62 axially relative to the pole piece 33 to achieve the spring pre-load calibration. For the calibration of the electromagnetic force, apertures 106 are formed through the top of the pole piece 33, which thereby provides one or more air voids. As is appreciated one having ordinary skill in the art, the addition of air voids reduces the electromagnetic force generated by the solenoid 12 upon energization of the coil 22. The number, size, and/or depth of apertures 106 may differ according to the desired output electromagnetic force. In general, the electromagnetic force reduction increases with the number, size, and depth of apertures. Also the force reduction is more prominent when an aperture is located in a spot with higher electromagnetic flux density. The electromagnetic force of a solenoid can thus be calibrated adding a plurality of apertures varying in number, size, depth, and/or location. Apertures can be added after the solenoid valve assembly 10 is completely assembled because of the physical location of the pole piece 33, which can be reached from the outside of the assembly. In this case, the solenoid valve assembly 10 is ideally to be designed with statistically more electromagnetic force than desired immediately after the initial assembly. The subsequent aperture addition or material removal at varying degrees brings the electromagnetic force to a desired value.

An alternative design or process is to manufacture uniformly on all pole pieces 33 one or more apertures with fixed number, size, depth, and location such that the resulting electromagnetic force after the initial assembly is statistically below the desired value. The electromagnetic force can then be calibrated to the desired value by adding a varying number of ferromagnetic inserts 108 in the direction of arrow A, adding insert(s) with varying height, or pressing the insert(s) of fixed height to varying depth of the aperture (s). As is appreciated by one having ordinary skill in the art, the addition of ferromagnetic inserts 108 reduces effective air void volume and thus electromagnetic resistance created by apertures, resulting in the elevated electromagnetic force. Alternatively, the aperture 106 may include threads 110 that are configured to receive a ferromagnetic screw 112 in the direction of arrow B. It should be appreciated that the electromagnetic force associated with the solenoid 12 will increase as the screw 112 is increasingly inserted into the pole piece 33. Throughout the life of the solenoid valve assembly 10, the insert(s) 108 should be retained without physical motion in the aperture(s) 106 at its desired position defined during the calibration process. The retention can be achieved by diametric interference between an insert and aperture, welding, soldering, crimping, or any mechanism or method.

In accordance with the embodiments set forth in FIG. 3, the spring and electromagnetic forces generated by the solenoid 12 may be calibrated after assembly has been completed. It should be further appreciated that alternative solenoid and valve assembly configurations are well known to receive an electrical input, and generate an electromagnetic force to operate the valve assembly. Accordingly, the present invention is not intended to be limited in scope to the configurations illustrated herein, but rather may be implemented in combination with any solenoid.assembly when calibration of the output electromagnetic force is desired.

Figure 4A:
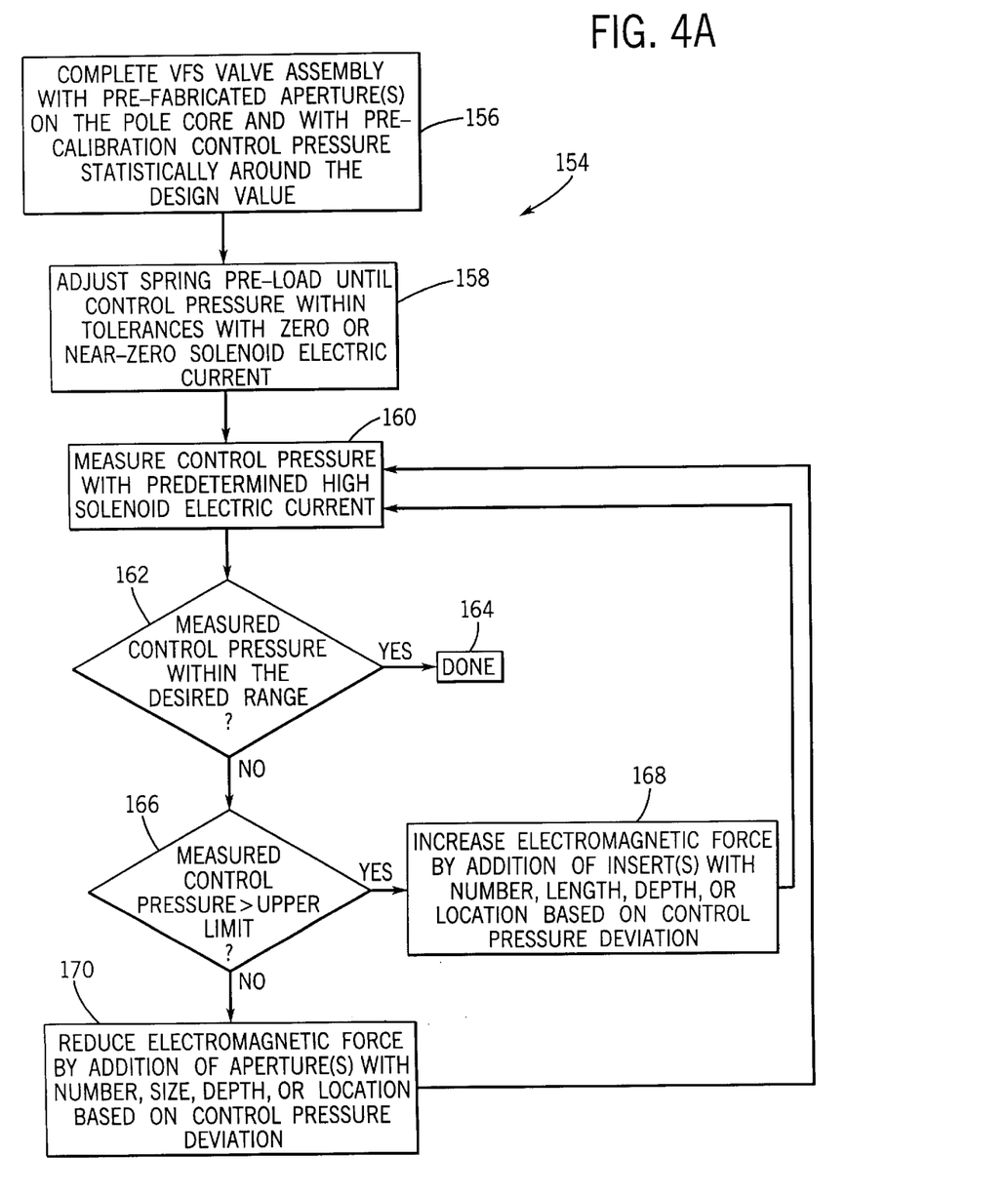
FIG. 4a is a flow chart of the general steps of one preferred method to calibrate variable force solenoid valve assembly in accordance with the preferred embodiments.

Referring now to FIG. 4A, a method 154 of calibrating the VFS valve assembly 10 in accordance with a preferred embodiment begins at step 156, where the assembly is completed with one or more pre-fabricated apertures on the pole piece and, preferably, with pre-calibration control pressure statistically around the designed value. Next, at step 158, the spring pre-load is adjusted with the solenoid electric current at zero or a predetermined near-zero value such that the control pressure is within the corresponding design range at this zero or low electric current. Next, at step 160, a predetermined high electric current is supplied to the assembly 10, and the actual control pressure is measured. It is determined at decision block 162 whether the measured control pressure is within the desired control pressure tolerance range. If so, the assembly is determined to be properly calibrated and to be accepted as a finished product and the method 154 ends at step 164. If, however, the measured control pressure is out of the desired range, method 154 proceeds to decision block 166, where it is determined whether the measured control pressure is greater than the upper limit. If so, the generated electromagnetic force is increased at step 168 by adding insert(s) 108. The insert addition can be an incremental process, and the process keeps reverting back to step 160 after each incremental insert addition until step 164 is reached. If a good correlation is established between the control pressure deviation and the number of inserts or their length or the depth to which they are pressed or screwed or the location where they are added, only one correction step at step 168 is needed If the decision at step 166 is "no," the generated electromagnetic force is reduced at step 170 by adding aperture(s) in addition to those pre-fabricated in or before step 156 and intended for receiving insert(s) at step 168. The aperture addition can be an incremental process, and the process keeps reverting back to step 160 after each incremental aperture addition until step 164 is reached. If a good correlation is established between the control pressure deviation and the number of apertures or their size or their depth or the location where they are added, only one correction step at step 170 is needed. It should be appreciated that some VFS valve assemblies 10 are out of the calibration range. Accordingly, a decision can be added between steps 162 and 166 for this type of situation to determine whether control pressure deviation is out of the calibration range.

Figure 4B:
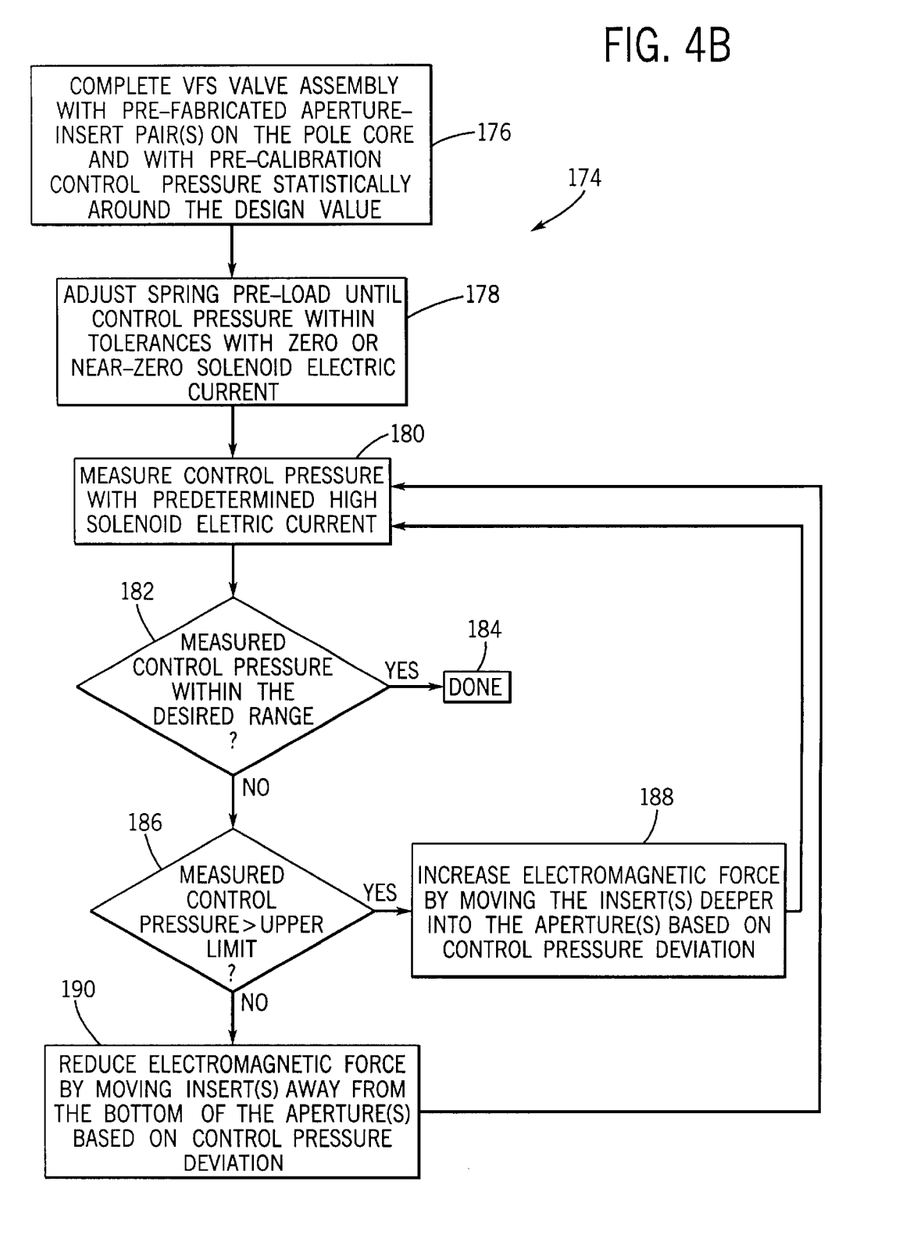
FIG. 4b is a flow chart of the general steps of another preferred method to calibrate variable force solenoid valve assembly in accordance with the preferred embodiments.

Referring now to FIG. 4b, a method 174 of calibrating the VFS valve assembly 10 in accordance with an alternate embodiment begins at step 176, where the assembly is completed with one or more pairs of prefabricated apertures 106 and inserts 108 or screws 112 on the pole piece and, preferably, with pre-calibration control pressure statistically around the designed value. For the purposes of clarity and convenience, the term "inserts" will be used hereinafter to apply to inserts 108, screws 112, and equivalent mechanical structure. The insert preferably has a depth which causes the solenoid to produce a statistically nominal electromagnetic force and thus a statistically desired control pressure, and there is enough room to move the insert either deeper into the aperture and away from the bottom to produce desired electromagnetic force or control pressure. The engagement between an insert and its aperture can be a thread or any other mechanical mechanism. Next, at step 178, the spring pre-load is adjusted with the solenoid electric current at zero or a predetermined near-zero value such that the control pressure is within the corresponding design range at this zero or low electric current. Next, at step 180, a predetermined high electric current is supplied to the assembly 10, and the actual control pressure is measured. It is determined at decision block 182 whether the measured control pressure is within the desired control pressure tolerance range. If so, the assembly is determined to be properly calibrated and to be accepted as a finished product and the method 174 ends at step 184. If, however, the measured control pressure is out of the desired range, method 174 proceeds to decision block 186, where it is determined whether the measured control pressure is greater than the upper limit. If so, the generated electromagnetic force is increased at step 188 by moving the insert(s) deeper into the aperture(s). The insert movement can be an incremental process, and the process keeps reverting back to step 180 after each incremental insert movement until step 184 is reached. If a good correlation is established between the control pressure deviation and the insert movement or location depth inside the aperture, only one correction step at step 188 is needed. If the decision at step 186 is "no," the generated electromagnetic force is reduced at step 190 by moving the insert(s) away from the bottoms of the aperture(s). The aperture movement can be an incremental process, and the process keeps reverting back to step 180 after each incremental insert movement until step 184 is reached. If a good correlation is established between the control pressure deviation and the insert movement or location depth inside the aperture, only one correction step at step 190 is needed. It should be appreciated that some VFS valve assemblies 10 are out of the calibration range. Accordingly, a decision can be added between steps 182 and 186 for this type of situation to determine whether control pressure deviation is out of the calibration range.

Figure 4C:
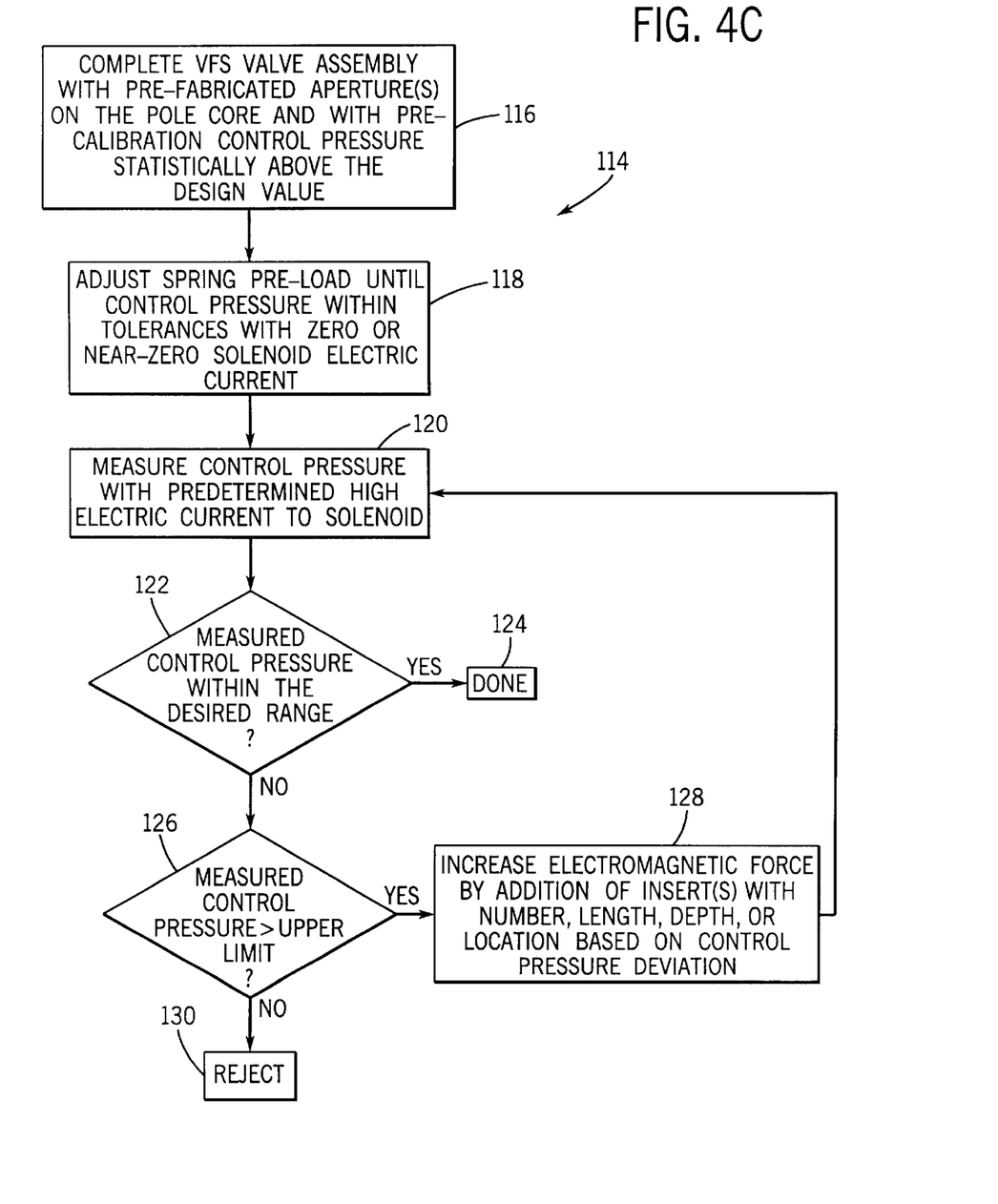
FIG. 4c is a flow chart of the general steps of another preferred method to calibrate variable force solenoid valve assembly in accordance with the preferred embodiments.

Referring now to FIG. 4c, a method 114 of calibrating the VFS valve assembly 10 in accordance with an alternate embodiment begins at step 116, where the assembly is completed with pre-fabricated aperture(s) on the pole piece and, preferably, with pre-calibration control pressure statistically above the desired value. Next, at step 118, the spring pre-load is adjusted with the solenoid electric current at zero or a predetermined near-zero value such that the control pressure is within the corresponding design range at this zero or low electric current. Next, at step 120, a predetermined high electric current is supplied to the assembly 10, and the actual control pressure is measured. It is determined at decision block 122 whether the measured control pressure is within the desired control pressure tolerance range. If so, the assembly is determined to be properly calibrated and to be accepted as a finished product and the method 114 ends at step 124. If, however, the measured control pressure is out of the desired range, method 114 proceeds to decision block 126, where it is determined whether the measured control pressure is greater than the upper limit. If so, the generated electromagnetic force is increased at step 128 by adding insert(s). The insert addition can be an incremental process, and the process keeps reverting back to step 120 after each incremental insert addition until step 124 is reached. If a good correlation is established between the control pressure deviation and the number of inserts or their length or the depth to which they are pressed or screwed or the location where they are added, only one correction step at step 128 is needed. If the decision at step 126 is "no," the assembly 10 is then rejected because the method 114 is unable to reduce the electromagnetic force. The rate of rejection depends on the pre-calibration statistical distribution of the control pressure relative to its desired value and tolerance range. It should be appreciated that even for those assemblies 10 that passed step 126 with higher control pressure, some of them have their control pressure values too high, and out of the calibration range. Accordingly, a decision can be added between steps 126 and 128 for this type of situation to determine whether control pressure deviation is out of the calibration range.

Figure 4D:
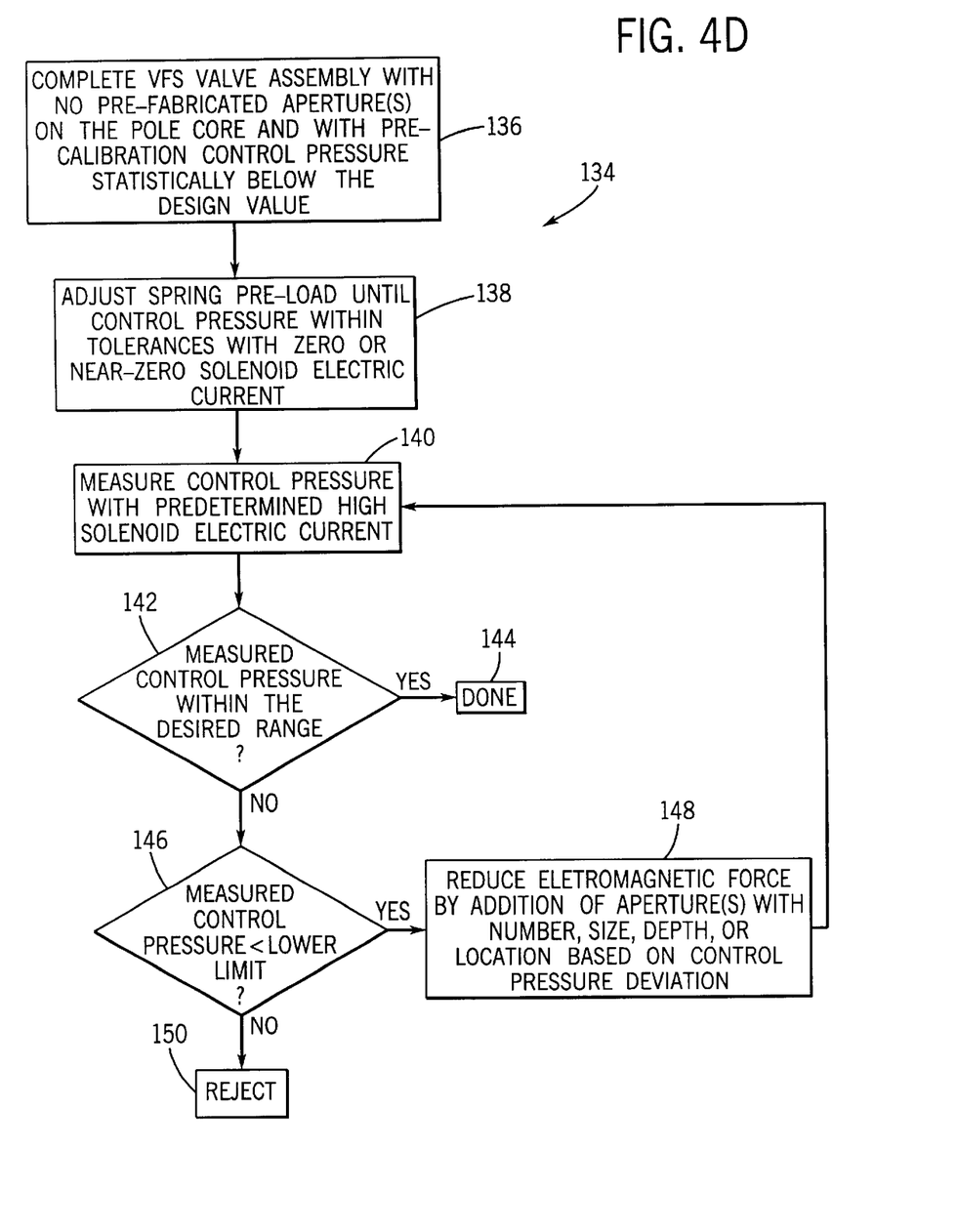
FIG. 4d is a flow chart of the general steps of another preferred method to calibrate variable force solenoid valve assembly in accordance with the preferred embodiments.

Referring now to FIG. 4d, a method 134 of calibrating the VFS valve assembly 10 in accordance with the preferred embodiment begins at step 136, where the assembly is completed with no pre-fabricated apertures and nor pre-fabricated inserts on the pole piece 33 and, preferably, with pre-calibration control pressure statistically below the desired value. Next, at step 138, the spring pre-load is with the solenoid electric current at zero or a predetermined near-zero value such that the control pressure is within the corresponding design range at this zero or low electric current. Next, at step 140, a predetermined high electric current is supplied to the assembly 10, and the actual control pressure is measured. It is determined at decision block 142 whether the measured control pressure is within the desired control pressure tolerance range. If so, the assembly is determined to be properly calibrated and to be accepted as a finished product and the method 134 ends at step 144. If, however, the measured control pressure is out of the desired range, method 134 proceeds to decision block 146, where it is determined whether the measured control pressure is lower than the lower limit. If so, the generated electromagnetic force is reduced at step 148 by adding aperture(s). The aperture addition can be an incremental process, and the process keeps reverting back to step 140 after each incremental aperture addition until step 144 is reached. If a good correlation is established between the control pressure deviation and the number of apertures or their size or their depth or the location where they are added, only one correction step at step 148 is needed. If the decision at step 146 is "no," the assembly 10 is then rejected because the method 134 is unable to increase the electromagnetic force. The rate of rejection depends on the pre-calibration statistical distribution of the control pressure relative to its desired value and tolerance range. It should be appreciated that even for those assemblies 10 that passed step 146 with lower control pressure, some of them have their control pressure values too low, and out of the calibration range. Accordingly, a decision can be added between steps 146 and 148 for this type of situation to determine whether control pressure deviation is out of the calibration range.

It should be appreciated that the electromagnetic force may be adjusted by any of the methods described above, or by any equivalent method as would be understood by those having ordinary skill in the art.

The invention has been described in connection with are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

We claim:

1. A method for calibrating a solenoid actuator having 1) a wire coil receiving current to produce a magnetic flux, 2) an armature slidably received within the solenoid assembly to move from a rest to an actuated position, and 3) a pole piece magnetically communicating with the coil to provide a flux path to the armature, the method comprising:
    A) completing assembly of the solenoid actuator;
    B) after step (A), supplying a predetermined current to a wire coil that is disposed within the solenoid, wherein the armature is drawn towards the pole piece with a actual solenoid output force in response to the current;
    C) determining a desired solenoid output force corresponding to the predetermined current;
    D) comparing the desired force to the actual force; and
    E) if the desired force is not substantially equal to the actual force, varying the size of at least one aperture that is disposed within the pole piece so as to vary the corresponding actual force, wherein the varying step is selected from the group consisting of 1) removing material from the pole piece so as to enlarge the size of the at least one aperture if the actual force is greater than the desired force, and 2) placing an at least one insert within the at least aperture if the desired force is less than the actual force.

2. The method as recited in claim 1, wherein the at least one insert is ferromagnetic.

3. The method as recited in claim 1, wherein an at least one insert is partially pre-inserted into the at least one aperture.

4. The method as recited in claim 3, wherein the at least one insert is further lowered into the at least one aperture so as to increase the actual force.

5. The method as recited in claim 3, wherein the at least one insert is raised within the aperture so as to decrease the actual force.

6. The method as recited in claim 1, wherein the solenoid includes a spool that is fixedly attached to the armature at a first end so as to be movable therewith, and in mechanical communication with a spring having a spring force that resists spool movement.

7. The method as recited in claim 6, wherein the spool further comprises lands located at a second end opposite the first end that are configured to interfere with corresponding orifices in a valve so as to control fluid pressure therein.

8. The method as recited in claim 7, wherein the desired force corresponds to a desired valve output pressure, and wherein the actual force corresponds to an actual valve output pressure.

9. The method as recited in claim 8, further comprising, before step (B), adjusting the spring force while substantially no electrical current is supplied to the solenoid to as to produce a desired no-current valve output pressure.

10. A variable force solenoid having a post-assembly calibration mechanism, the solenoid comprising:
    a hollow, generally cylindrical core;
    a push rod slidably mounted within the core;
    a coil assembly surrounding the core and configured to apply a magnetic force to the push rod upon energization of the coil;
    an armature disposed adjacent the coil assembly;
    a magnetic pole piece at least partially disposed radially inwardly of the coil assembly and in magnetic communication with the armature and having an outer wall that defines at least one variable size aperture disposed in the magnetic pole; and
    at least one insert configured to be inserted into the at least one aperture so as to increase an amount of electromagnetic force generated by the solenoid.

11. A variable force solenoid having a post-assembly calibration mechanism, the solenoid comprising:
    a hollow, generally cylindrical core;
    a push rod slidably mounted within the core;
    a coil assembly surrounding the core and configured to apply a magnetic force to the push rod upon energization of the coil;
    an armature disposed adjacent the coil assembly; and
    a magnetic pole piece at least partially disposed radially inwardly of the coil assembly and in magnetic communication with the armature and having an outer wall that defines at least one variable size aperture disposed in the magnetic pole;
    wherein the at least one aperture includes internal threads, and wherein an insert comprises a screw configured to rotate within the at least one aperture so as to one of raise and lower within the at least one aperture.

* * * * *